US007369770B2

(12) United States Patent
Penninckx et al.

(10) Patent No.: US 7,369,770 B2
(45) Date of Patent: May 6, 2008

(54) METHOD OF ASSIGNING CARRIER FREQUENCIES IN AN OPTICAL TRANSMISSION NETWORK

(75) Inventors: Denis Penninckx, Nozay (FR); Gabriel Charlet, Villiers-le-Bacle (FR); Ludovic Noirie, Nozay (FR)

(73) Assignee: ALCATEL, Paris (FR)

( * ) Notice: Subject to any disclaimer, the term of this patent is extended or adjusted under 35 U.S.C. 154(b) by 610 days.

(21) Appl. No.: 10/787,132

(22) Filed: Feb. 27, 2004

(65) Prior Publication Data

US 2004/0170427 A1 Sep. 2, 2004

(30) Foreign Application Priority Data

Feb. 28, 2003 (FR) .................................. 03 02444

(51) Int. Cl.
*H04J 14/00* (2006.01)

(52) U.S. Cl. ........................... 398/69; 398/25; 398/27; 398/43; 398/57

(58) Field of Classification Search .................. 398/25, 398/34, 57, 69, 43, 27
See application file for complete search history.

(56) References Cited

U.S. PATENT DOCUMENTS 6,278,693 B1 * 8/2001 Aldred et al. ............... 370/252
7,039,270 B2 * 5/2006 Poti et al. ..................... 385/24
7,046,930 B2 * 5/2006 Kawarai ...................... 398/27
2002/0080435 A1 * 6/2002 Lu et al. ..................... 359/109
2002/0101635 A1 * 8/2002 Taketomi .................... 359/124
2003/0020977 A1 * 1/2003 Smith et al. ................ 359/110
2003/0058494 A1 * 3/2003 Roberts et al. ............. 359/115
2003/0194234 A1 * 10/2003 Sridhar et al. ................ 398/43
2005/0026621 A1 * 2/2005 Febvre et al. ............... 455/450

OTHER PUBLICATIONS

Maher, Ali; Vincent, Leboucher; Denis, Penninckx. "Intelligent Lightpath Selection Schemes". Sep. 2002. vol. 2 pp. 1-2. http://ieeexplore.ieee.org/iel5/10668/33652/01600985.pdf?isnumber=&arnumber=1600985.*

A. Jukan et al, "Service-Specific Wavelength Allocation in QOS-Routed Optical Networks", IEEE GLOBECOM 1998, Globecom '98. The Bridge to Global Integration. Sydney, Nov. 8-12, 1998, IEEE Global Telecommunications Conference, NY, NY, Vo. 4, Nov. 8, 1998, pp. 2270-2275, XP000894444.

(Continued)

*Primary Examiner*—Kenneth Vanderpuye
*Assistant Examiner*—Thi Q. Le
(74) *Attorney, Agent, or Firm*—Sughrue Mion, PLLC

(57) ABSTRACT

To optimize the resources of an optical transmission network using wavelength division multiplexing, assigning carrier frequencies to signals to be transmitted consists in associating N sets of optical frequencies of the comb with N respective ranges of consecutive error rate values, each of the sets comprising frequencies generating a mean error rate in the associated range, defining a measured signal transmission constraint level that is a function of the transmission constraint parameter(s) and may take N distinct values referred to as constraint values, associating the N constraint values in increasing order respectively with the N sets of frequencies in decreasing order of the error rate values of the associated N ranges, assigning any signal to be transmitted a constraint value obtained by applying the measurement, and assigning the signal to be transmitted a carrier frequency belonging to one of the sets of frequencies that is associated with a constraint value at least equal to the constraint value assigned to the signal to be transmitted.

13 Claims, 3 Drawing Sheets

OTHER PUBLICATIONS

N. Golmie et al, "A Differentiated Optical Services Model for WDM Networks", IEEE Communications Magazine, IEEE Service Center. Piscataway, NJ, US, vol. 38, No. 2, Feb. 2000, pp. 68-73, XP000912316.

S. Chen et al, "An Overview of Quality of Service Routing for Next-Generation High-Speed Networks: Problems and Solutions", IEEE Network, IEEE, Inc. NY, NY, vol. 12, No. 6, Nov. 1998, pp. 64-79, XP000873129.

* cited by examiner

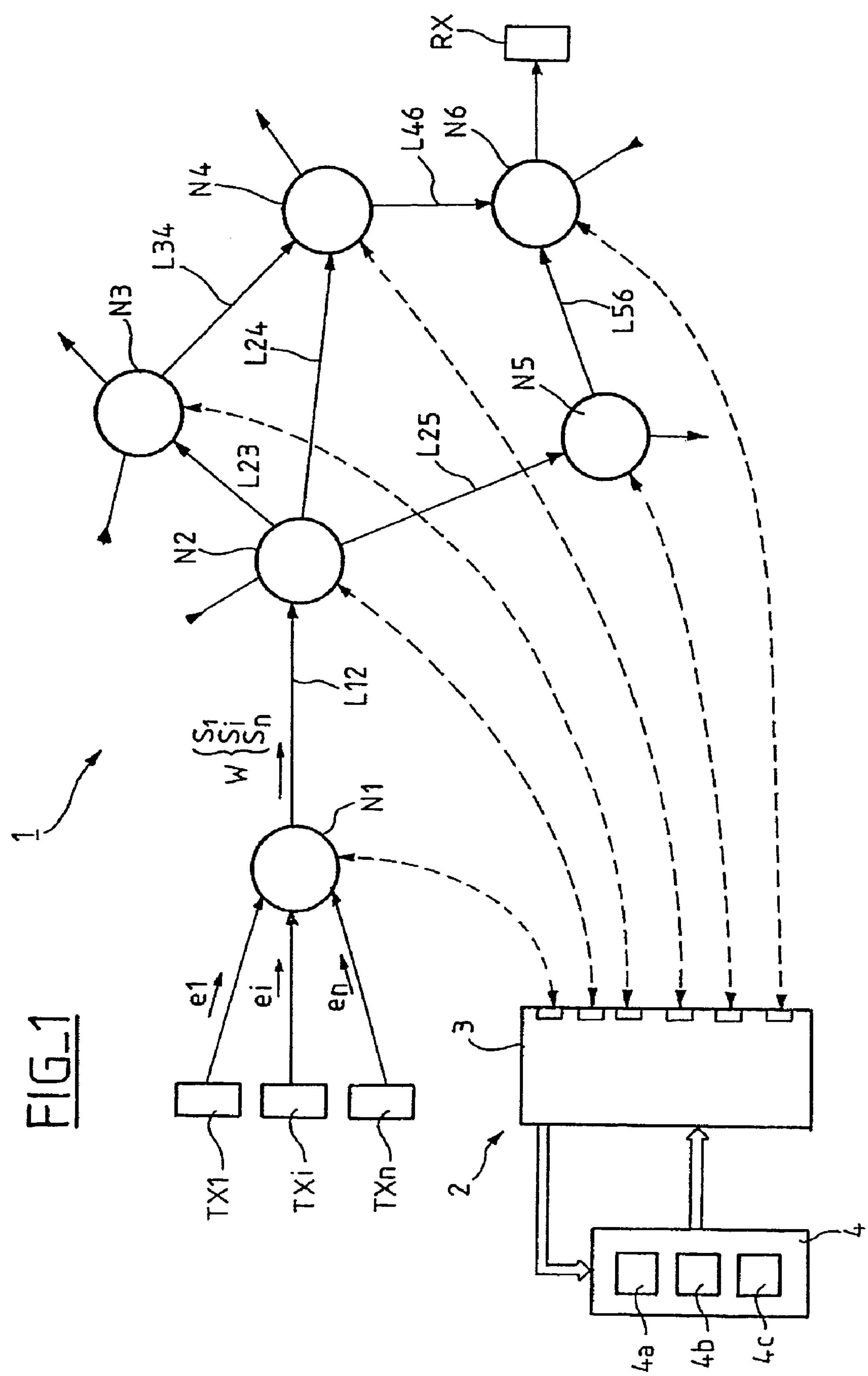
FIG_1
1
TX1
TXi
TXn
e1
ei
en
N1
N2
N3
N4
N5
N6
L12
L23
L24
L25
L34
L46
L56
W
S1
Si
Sn
RX
2
3
4
4a
4b
4c

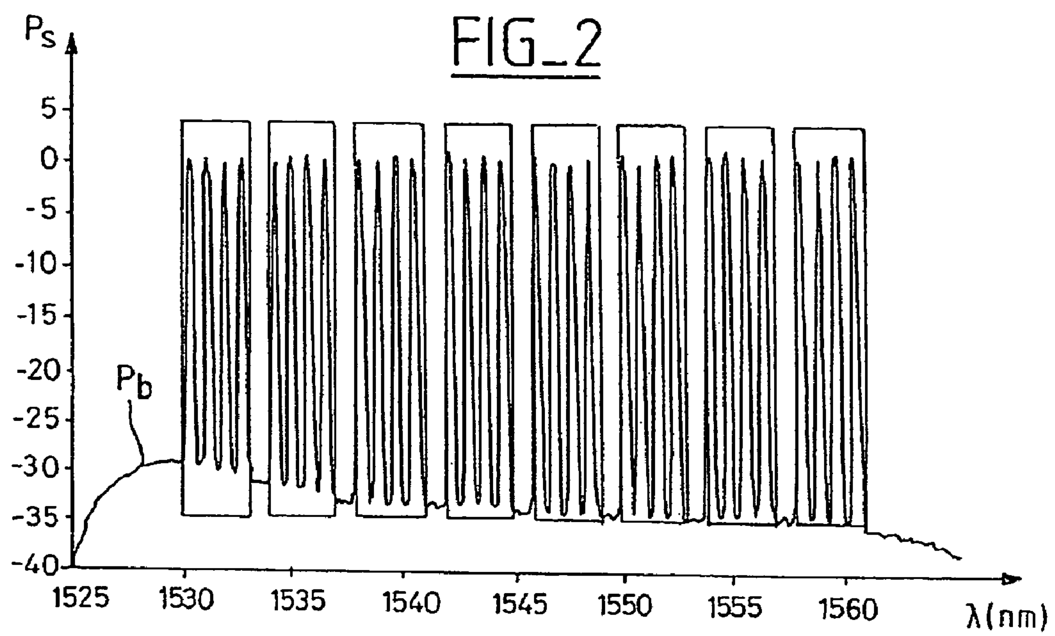
FIG_2
Ps
5
0
-5
-10
-15
-20
-25
-30
-35
-40
Pb
1525
1530
1535
1540
1545
1550
1555
1560
λ(nm)
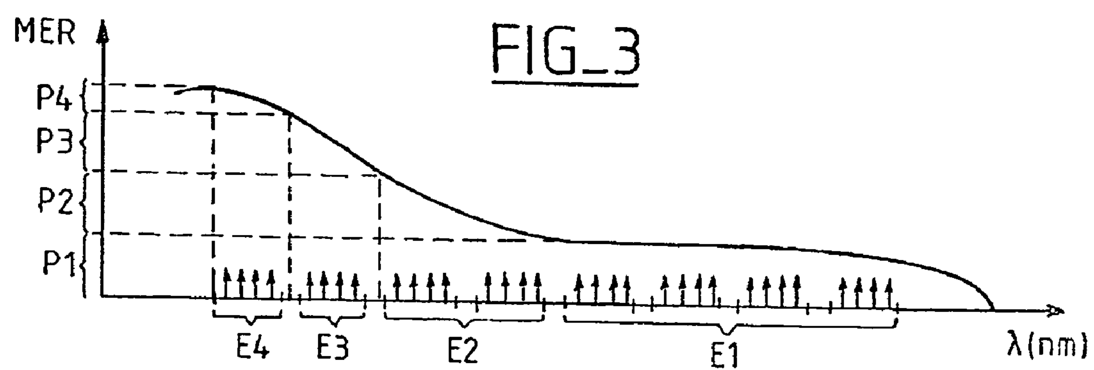
FIG_3
MER
P4
P3
P2
P1
E4
E3
E2
E1
λ(nm)
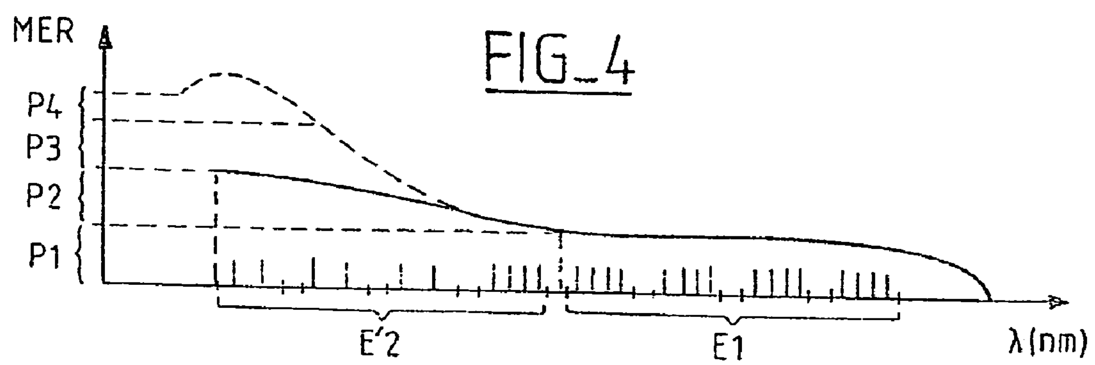
FIG_4
MER
P4
P3
P2
P1
E'2
E1
λ(nm)

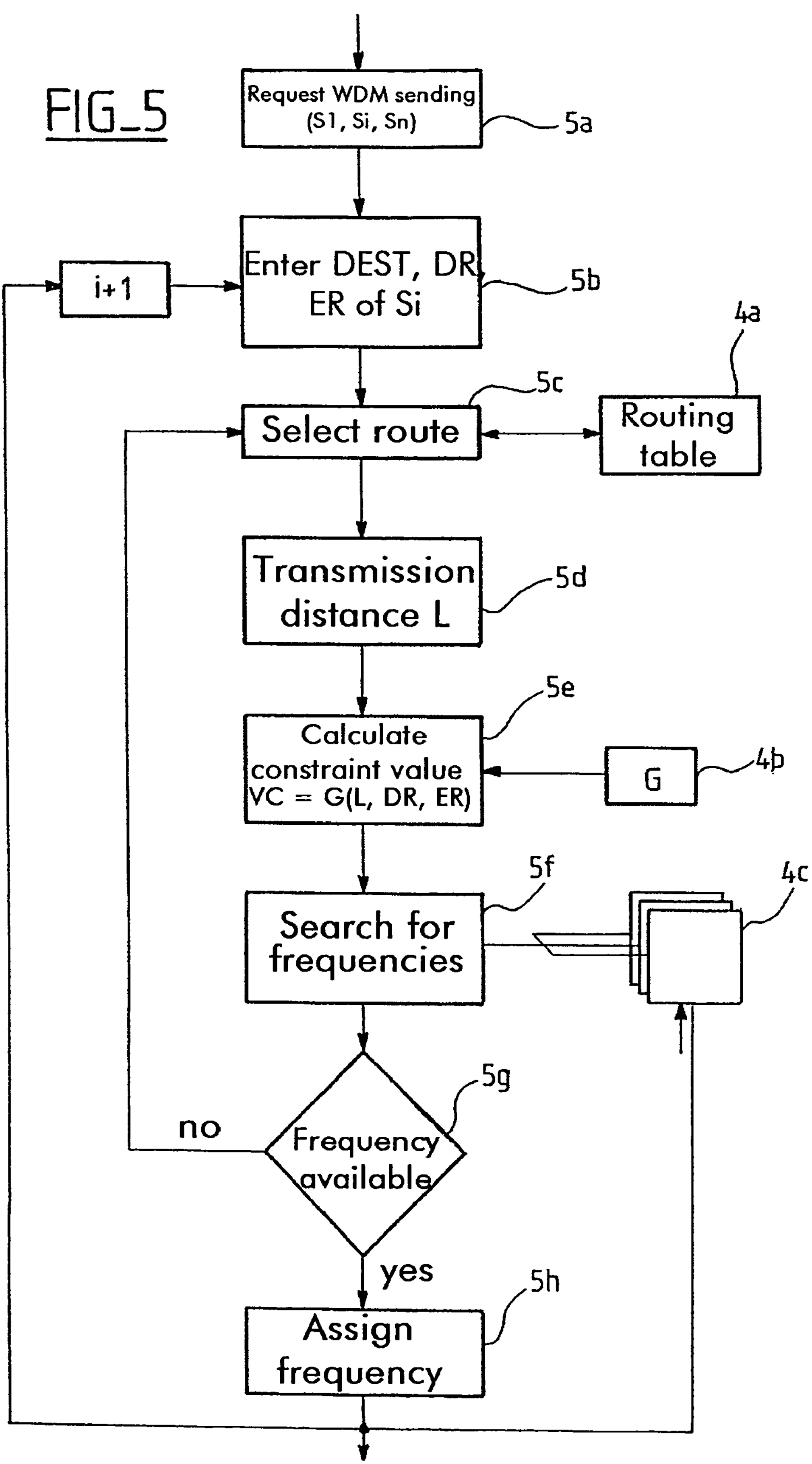
FIG_5
Request WDM sending (S1, Si, Sn)
5a
Enter DEST, DR, ER of Si
5b
i+1
5c
Select route
Routing table
4a
Transmission distance L
5d
5e
Calculate constraint value VC = G(L, DR, ER)
G
4b
5f
Search for frequencies
4c
5g
no
Frequency available
yes
5h
Assign frequency

METHOD OF ASSIGNING CARRIER FREQUENCIES IN AN OPTICAL TRANSMISSION NETWORK

CROSS-REFERENCE TO RELATED APPLICATIONS

This application is based on French Patent Application No. 03 02 444 filed Feb. 28, 2003, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of optical transmission networks and to be more precise that of networks utilizing wavelength division multiplexing. It relates primarily to a method of assigning to signals to be transmitted carrier frequencies that can be used in this kind of network.

2. Description of the Prior Art

Optical networks essentially comprise nodes interconnected by optical links. A node is often connected to a plurality of other nodes, in which case it incorporates routing functions for selectively switching signals received from upstream links to different downstream links as a function of the respective destinations of the signals. Some nodes have access functions for adding signals to the network and/or dropping signals from the network.

In wavelength division multiplex (WDM) networks, the signals conveyed by the links are WDM signals comprising a plurality of components carried by respective different optical frequencies. A WDM signal is therefore formed of a combination of optical signals each consisting of an optical carrier wave modulated as a function of the information to be sent. Each optical frequency (or the corresponding wavelength) of a carrier wave therefore defines a corresponding WDM channel. In the remainder of this description, the channels are referred to interchangeably by their optical frequencies f or by their wavelengths $\lambda$, which are related by the equation $f=c/\lambda$ in which c is the velocity of light in a vacuum.

In WDM networks, a first option is for the nodes to be equipped with regenerator devices operating separately on each channel of the wavelength division multiplexes received to carry out reshaping and resynchronization. The network is then known as an opaque network and has the advantage of providing a minimum transmission quality fixed for all the routes that the various channels may take. On the other hand, the regenerators affect the cost of the network, which increases as the number of WDM channels increases.

A less costly solution is to design a network with no individual channel regenerator devices. This kind of network is referred to as transparent but may nevertheless include optical amplifiers adapted to amplify simultaneously the channels of the wavelength division multiplexes transmitted. There is additionally the compromise of a hybrid network in which only some links are provided with regenerators.

In a transparent network (or in the transparent portion of a hybrid network), the links between two nodes, whether direct or indirect via other nodes, are themselves transparent and must on average be lower than in an opaque network because, despite the possible inclusion of amplifiers, the signals are degraded to an extent that increases with the transmission distance. A transparent network therefore offers less flexibility of design and use.

Furthermore, it has been observed that the transmission quality of an optical signal depends among other things on the optical frequency of the wave carrying the signal.

For example, in the C band of wavelengths from 1 530 nm to 1 560 nm, the lower wavelengths are found to be less “efficient”, i.e. achieve transmission qualities that on average are worse than those achieved with higher wavelengths. This is because, at lower wavelengths, losses in the fibers in particular are higher, more noise is introduced by conventional amplifiers, and nonlinear effects are aggravated.

This phenomenon remains marginal provided that a transparent network uses carrier frequencies belonging to a relatively narrow band of frequencies. However, it is not without consequences as the band of frequencies that can be used becomes ever wider.

The simplest way to take account of this phenomenon is to rate the network (link wavelengths, amplifier gains) as a function of the least efficient carrier frequencies. However, this means that the network is rated higher than it need be for other frequencies.

Various compensation measures might also be envisaged, such as the use of dedicated amplifiers of higher gain at low wavelengths, or controlling chromatic dispersion with a view to equalizing the transmission performance of the various wavelengths of the band used. These solutions always lead to an additional cost or to less than optimum use of the resources of the network, however.

Accordingly, an object of the invention is to improve the use of the resources of a transparent or partially transparent network.

On examining the operating conditions of transparent networks in more detail, it emerges that the signals to be transmitted do not impose uniform transmission constraints. For example, the transmission distance without regeneration varies from one signal to another according to the destination of the signal and the route chosen to reach it. Similarly, in some networks there may be a plurality of transmission data rates, depending on the signals concerned. Then again, there may be different classes of service that can be assigned to the signals, those classes imposing respective different maximum permissible values of the error rates affecting the signals received after transmission.

Accordingly, in a transparent network, it is found, firstly, that the transmission constraints vary as a function of the signals and, secondly, that the transmission quality of an optical signal depends on the frequency of the carrier wave. Rather than seeking to compensate the differing efficiencies of the carrier waves according to their frequencies, the invention seeks a more economic approach that, to the contrary, matches the varying efficiencies of the carrier frequencies to the varying constraints of the signals to be transmitted, i.e. establishes a rule for assigning the more efficient frequencies to the signals with the more severe constraints, and vice versa.

This kind of assignment rule can be generated if it is possible to define beforehand a measurement of the efficiency of the frequencies and a measurement of the “constraining” character of the signals. To define these concepts, it must be possible to attach them to measurable parameters operative in transmission over transparent links.

One decisive parameter is the transmission quality of a signal, which may be measured directly by determining the error rate of a signal received after transmission. This quality is conditioned firstly by physical parameters associated with the link, such as its length, the type of fiber used, and the amplifier characteristics. It depends, secondly, on parameters associated with the physical properties of the signal. Those physical properties are conditioned by the spectrum of the signal, and thus by its carrier frequency and its data rate, as already mentioned, and additionally by its modulation format. The transmission quality of a signal also depends on its environment, i.e. the presence and the nature of other signals transmitted simultaneously on nearby frequencies.

With regard to the efficiency of a given frequency, it can be evaluated from the mean value of the error rate values of the signals carried by that frequency as received after transmission in the network concerned.

As for the constraining character of a signal, this may be the result of a plurality of parameters linked to each signal to be transmitted and referred to hereinafter as "transmission constraint parameters". The transmission distance, the data rate, and the maximum error rate are examples of such parameters. The resulting "constraint value" is therefore a function of the various transmission constraint parameters that can be assigned to a signal.

When the efficiency of a frequency has been defined, and likewise a function for evaluating the constraint values of the signals, it becomes possible to establish a one-to-one correspondence between each frequency and a constraint value that the frequency concerned might assume. In practice, however, to allow some flexibility in assigning an appropriate frequency to any signal, it is necessary to construct a limited predefined number N of classes or sets of frequencies such that each class groups together the frequencies whose efficiencies are within a given range of values, and thus whose mean error rates are also in a given range of values. The function of the constraint parameters mentioned hereinabove can therefore be seen as a staged function able to assume N distinct values, referred to as constraint values, associated with the N sets of frequencies.

The foregoing considerations make it possible to define more precisely the method of the invention for assigning the carrier frequencies to the signals.

SUMMARY OF THE INVENTION

The invention consists in a method of assigning optical carrier frequencies to signals to be transmitted in an optical transmission network using wavelength division multiplexing, the frequencies belonging to a comb of optical frequencies, the signals received after transmission in the network and carried by a given carrier frequency having a mean error rate that depends on the given carrier frequency, and one or more transmission constraint parameters being associated with any signal to be transmitted, which method consists in:

- associating N sets of optical frequencies of the comb with N respective ranges of consecutive error rate values, each of the sets comprising frequencies generating a mean error rate in the associated range,
- defining a measured signal transmission constraint level that is a function of the transmission constraint parameter(s) and may take N distinct values referred to as constraint values,
- associating the N constraint values in increasing order respectively with the N sets of frequencies in decreasing order of the error rate values of the associated N ranges,
- assigning any signal to be transmitted a constraint value obtained by applying the measurement, and
- assigning the signal to be transmitted a carrier frequency belonging to one of the sets of frequencies that is associated with a constraint value at least equal to the constraint value assigned to the signal to be transmitted.

One of the constraint parameters may be a transmission distance that the signal must be able to travel without benefit of individual regeneration. Another parameter may be a minimum signal transmission data rate or a maximum error rate imposed for the received signal after its transmission.

The invention also consists in an optical transmission network using wavelength distribution multiplexing to transmit signals carried by respective optical carrier frequencies belonging to a comb of optical frequencies, which network includes processor means adapted to assign optical carrier frequencies to the signals to be transmitted by a method of the invention.

Other aspects and advantages of the invention will become apparent in the course of the following description with reference to the drawings.

BRIEF DESCRIPTION OF THE DRAWINGS

FIG. 1 is a diagram depicting one example of a transparent network of the invention.

FIG. 2 depicts one example of a WDM spectrum as observed at the output of an optical amplifier.

FIGS. 3 and 4 depict examples of curves plotting mean error rate variations as a function of wavelength for respective different combs of frequencies used to constitute a multiplex.

FIG. 5 is a flowchart depicting the main steps of the process of assigning frequencies by a method of the invention.

DETAILED DESCRIPTION OF THE PREFERRED EMBODIMENT

To illustrate the invention, FIG. 1 depicts a portion of a conventional transparent network 1 that comprises a plurality of nodes N1 to N6 and optical links L12, L23, . . . , L56 between the nodes. A link may comprise a single length of optical fiber or a plurality of lengths coupled by optical amplifiers.

In the example shown, the node N1 is an access node to the network and communicates with transmitter terminals TX1, . . . , TXi, . . . , TXn. The node N6 is also an access node and communicates with receiver terminals RX.

The nodes N2 to N5 of the core of the network include spectral and spatial optical switches adapted to switch selectively signals received from upstream nodes to downstream nodes. For example, the node N2 which receives a multiplex W from the node N1 is able to couple each of its spectral components S1, Si, Sn selectively to one of the links L23, L24, L25 toward the respective nodes N3, N4, N5.

In the example depicted, the network is managed in a centralized manner by a network controller 2 which essentially comprises a processor unit 3 cooperating with a memory 4. The unit 3 is able to communicate with the nodes via control links symbolized by dashed-line arrows. These links enable the controller 2 to receive continuously from access nodes all requests for transmission of signals within the network and to command the switches of the nodes accordingly to impose on each of the signals when sent a route selected as a function of data relating to the topology of the network and to all of the requests. The data is collected together in the form of a routing table 4*a* contained in the memory 4.

For example, if signals e1, ei, en from transmitter terminals TX1, TXi, TXn must be transmitted to respective receiver terminals RX, the access node N1 must convert them into the form of optical signals S1, Si, Sn and generate a multiplex W incorporating them. Beforehand, the node N1 sends the controller 2 a request that contains information relating to the signals, and in particular their destinations. As a function of the request, and allowing for any other request coming from other access nodes, the controller 2 drives the switches of the nodes through which the optical signals S1, Si, Sn in particular of the multiplex W must pass in transit, so as to form uninterrupted optical links between the node N1 and the access nodes to the respective receiver terminals. In this example, it can be seen that to access the receiver terminal RX there is a plurality of available routes: N1-N2-N3-N4-N6, N1-N2-N4-N6, or N1-N2-N5-N6.

Up to this point, all elements of the network that have been mentioned are conventional and therefore do not need to be described in more detail.

The use of the method of the invention is described next with reference firstly to FIGS. 2 to 4, which illustrate the example of a network designed to carry band C carrier frequencies with wavelengths from 1 530 nm to 1 560 nm.

The example uses the particular situation where the carrier frequencies of the channels belong to a standard frequency grid in which the increment, i.e. the difference between the frequencies of two adjacent channels, is 100 GHz (corresponding to a difference between the wavelengths of approximately 0.8 nm). The example further applies to a network using band switching, in which, to facilitate demultiplexing band by band, the carrier frequencies that may be used belong to a comb organized into eight bands of four frequencies, two adjacent bands being spaced by a spectral width equal to two increments of the grid.

FIG. 2 depicts the curve representing the spectrum of a WDM signal using the comb indicated hereinabove, such as may be observed at the output of a standard send amplifier. Here this spectrum expresses the variations in the spectral power density Ps in dB as a function of the wavelength λ in nm.

The figure shows the spectrum lines corresponding to the carrier frequencies and that they arise from a curve Pb corresponding to the noise produced by the amplifier. The shape of the spectrum shows that the signal to noise ratio of the transmitted channels increases with the wavelength, from which it may be deduced that on reception after transmission under given conditions, signals carried by lower wavelengths will have a higher error rate than signals carried by higher wavelengths. This example shows that the carrier frequencies do not have identical efficiencies.

More generally, for a given network, and for each frequency of a given comb, it is possible to establish the average of the error rates, referred to as the mean error rate "MER", of signals received after transmission in the network and carried by that frequency. This mean value can be estimated experimentally by a statistical method taking account of measured error rates for test signals carried by each frequency and transmitted via diverse links and predefined routes of the network.

This evaluation allows the definition of the relationship between the mean error rate MER and the carrier frequency (or wavelength).

FIG. 3 shows one example of a curve representing this type of relationship for the comb previously referred to. The curve represents the variations in the mean error rate MER as a function of the wavelength λ in nm, the wavelengths of the comb being symbolized by vertical arrows disposed along the wavelength axis.

According to the invention, by then choosing a plurality of ranges of consecutive error rate values, there are constituted the same number of sets of optical frequencies of the comb such that each set consists of frequencies belonging to the same range of performance, i.e. generate a mean error rate MER within the associated range.

Accordingly, in the example depicted in FIG. 3, there have been selected four ranges P1, P2, P3 and P4 of increasing error rate values that are used to define four sets of frequencies E1, E2, E3 and E4 that respectively group together 16, 8, 4 and 4 frequencies of the comb previously described.

Note that the result obtained generally depends on the comb of frequencies used because the mean error rate MER of a carrier frequency can be affected by the presence of the other carrier frequencies in the same multiplex. This is caused by interactions between neighboring channels caused by nonlinear phenomena such as four wave mixing (FWM) and cross gain modulation. The resulting crosstalk represents a penalty in direct proportion to the optical power and in inverse proportion to the spectral spacing between channels.

FIG. 4 depicts this phenomenon in the case of a different comb, whose wavelengths, again symbolized by vertical arrows, are more widely spaced at the lower wavelengths. There is then obtained a curve (full line) representing the variations in the mean error rate MER as a function of the wavelength λ that is different from the preceding curve (dashed line): the mean error rate is better at the lower wavelengths.

Thus by taking the same ranges P1 to P4 of error rate values as previously, there are obtained only two non-empty sets of frequencies E1 and E'2. The set E1 associated with the range P1 is unchanged. On the other hand, the range P2 is associated with a new set E'2 comprising ten frequencies.

It is therefore possible to define for, each comb that may be envisaged, N sets of frequencies, where the number N is of course a function of the comb concerned and of the selected ranges of error rate values. The information identifying for the selected comb(s) the frequencies of the various sets are then stored in the memory 4 of the controller 2 in the form of a corresponding table 4*c*.

To optimize the use of the network, in accordance with the invention, the N sets of the error rate values of the N associated ranges taken in decreasing order then respectively correspond to N distinct values that the constraint value of the signals can assume. The simplest implementation of the invention is that depicted in FIG. 4, where there are only two sets of frequencies (N=2), and therefore only two distinct constraint values. The method then consists simply in assigning signals whose constraint value is high only frequencies from the set E1 associated with the range P1 of lower error rates. The signals whose constraint value is low are assigned as priority frequencies from the set E'2 associated with the range P2 of higher error rates, without excluding the option of assigning them frequencies from the other set.

Generally speaking, a constraint value VC is representative of a minimum level of performance imposed on the transmission of a signal. Depending on the network concerned, the constraint value of a signal can depend on various constraint parameters that each contribute to raising the minimum performance level.

One simple situation is that in which the data rate and an imposed maximum error rate are the same for all the signals. The constraint value VC is then essentially a function of the transmission distance, which in practice may therefore constitute the only constraint parameter to be taken into account. Returning to the example depicted in FIG. 4, the rule for assigning frequencies simply amounts to fixing a transmission distance limit value, assigning signals to be transmitted over a distance equal to or greater than that limit value one of the wavelengths from the set E1 exclusively, and assigning signals to be transmitted over a distance less than this limit value one of the wavelengths from the set E'2 or possibly the set E1. The distance limit value is a distance value between the minimum and maximum transmission distances in the network. It may be selected approximately or, if possible, experimentally, to constitute a statistically optimum value.

If the network is additionally used to transmit signals having different data rates, then the data rate is another constraint parameter. This leads to defining a function G of the transmission distance and data rate for evaluating a resulting constraint value VC. The function referred to may assume N values corresponding to the N constraint values and may be defined experimentally so that each frequency belonging to that of the N sets of frequencies which is associated with one of the constraint values allows any signal having the same constraint value and carried by that frequency to be transmitted over the imposed transmission distance, at its imposed data rate, and with an error rate at most equal to the imposed maximum rate.

Other parameters that depend on functional options provided within the network may be identified. In particular, if the signals may belong to different classes of service imposing different permissible maximum receive error rate values, then that class of service or that maximum error rate also constitutes a constraint parameter to be taken into account in defining the function G.

The N values that the function G can assume therefore correspond to the respective N constraint values VC1-VCN that, taken in increasing order, correspond to the respective N sets of frequencies taken in decreasing order of the error rate values of the associated N ranges.

The function G may simply take the form of a table 4*b* stored in the memory 4 of the controller 2 and addressed as a function of the constraint parameters to be taken into account. To each address there therefore corresponds an item of data representative of a corresponding constraint value VC.

The function G may also be created from an analytical function with one or more variables, such as a polynomial function, for example, the N values that the function G may assume being rounded values of the analytical function. With the constraint parameters cited hereinabove, this analytical function is an increasing function of the distance and the data rate and a decreasing function of the maximum permissible error rate value.

To summarize, in the general case, the assignment of optical carrier frequencies to the signals to be transmitted then consists in:

- assigning any signal to be transmitted a constraint value obtained by applying the function G to the constraint parameter(s) of the signal, and
- assigning that signal one of the carrier frequencies of one of the sets of frequencies that is associated with a constraint value at least equal to the constraint value assigned to the signal to be transmitted.

In practical terms, the method of the invention is implemented by a program executed by the processor unit 3, this program using in particular the table 4*c* which identifies, for each access node, the frequencies of each of the N sets and the function G (for example the table 4*b*).

FIG. 5 depicts in the form of a flowchart the main steps of one example of an algorithm for this program. In this example, the constraint parameters of a signal are its transmission distance L, its data rate DR and the maximum error rate ER corresponding to its class of service.

It is assumed that a comb of frequencies that may be used in the network has been defined and that the unit has updated the routing table 4*a* as a function of all requests received from the network.

For each access node that has submitted a WDM sending request, the process for assigning frequencies for the request starts in step 5*a* by taking account of information relating to individual signals S1, Si, Sn that constitute the multiplex.

For each signal Si, the step 5*b* extracts from said information what it needs to determine the constraint parameters: its destination DEST, its data rate DR, its class of service, and thus the maximum error rate ER. The data rate DR and the maximum error rate ER constitute directly constraint parameters.

The transmission distance L is determined in step 5*d* after step 5*c* has selected a route for the destination DEST as a function of data contained in the routing table 4*a*.

Step 5*e* consists in using the function G to determine the constraint value VC=G(L, DR, ER) of the signal Si. The value obtained is one of the N constraint values VC1-VCN, with the result that in step 5*f* it is possible to determine from the table 4*c* the frequencies that may be assigned to the signal Si, i.e. the frequencies of the set associated either with the constraint value obtained or one of the sets associated with higher constraint values.

The step 5*g* verifies that there is at least one available frequency that can be assigned. If so, the step 5*h* assigns one of those frequencies to the signal Si. The table 4*c* is then accessed to update an indicator associated with the access node concerned and with the assigned frequency, indicating that the latter is no longer available. The process continues by returning to the step 5*b* to process the next signal Si+1.

If it is found in step 5*g* that no frequency that may be assigned is available, a first option is simply to suspend sending the signal Si pending a subsequent WDM sending request. Another option is for the process to return to the step 5*c* to look for another route involving a shorter transmission distance L.

After taking account of all the signals to be transmitted via the access node and assigning corresponding frequencies, if possible, the processor unit 3 advises the node of this, and the node may then construct the multiplex and proceed to send it. The same process is repeated for each access node of the network that has sent a sending request.

Of course, the algorithm that has just been described lends itself to numerous variants. For example, one advantageous option is to use a plurality of combs of frequencies and consequently a plurality of associated tables 4*c*. It is then possible to exploit the fact that by modifying the spacing between the frequencies, the different grids obtained offer varying options in terms of quality or spectral compactness. To be efficient compared to a regular spacing locked to a frequency grid, different spacings must be such that the reduced spectral compactness is compensated by enhanced performance.

To be more precise, if the frequencies of the comb belong to a grid of optical frequencies spectrally spaced in a regular manner at a given increment, the frequencies of the comb must be spectrally spaced in an irregular manner such that the number of frequencies belonging to at least one of the N sets of frequencies associated with a range of error rate values among the higher values must be less than the number of frequencies belonging to the set of frequencies associated with the same range of error rate values obtained when the frequencies of the comb are spaced in a regular manner and at that increment. By following this rule, consisting in increasing the spacing of initially lower performing frequencies, the number of higher performing frequencies is increased.

Note finally that the constraint values VC mentioned previously and the N distinct values VC1-VCN thereof merely serve to establish a hierarchy in the overall magnitude of the constraints imposed by the signals. The values VC1-VCN are not necessarily numerical values having meanings other than the identification of a rank within the hierarchy of constraints. This is the case in particular if the function G is materialized by a table 4*b* that may be addressed as a function of constraint parameters. Each item of data from the table is simply representative of one of N ranks for pointing to an area of the table 4*c* containing the identity of the frequencies from the set of frequencies corresponding to that rank.

There is claimed:

1. A method of assigning optical carrier frequencies to signals to be transmitted in an optical transmission network using wavelength division multiplexing, said frequencies belonging to a comb of optical frequencies, the signals received after transmission in said network and carried by a given carrier frequency having a mean error rate that depends on said given carrier frequency, and one or more transmission constraint parameters being associated with any signal to be transmitted, which method comprises:

associating N sets of optical frequencies of the comb with N respective ranges of consecutive error rate values, each of said sets comprising frequencies generating a mean error rate in the associated range;

defining a measured signal transmission constraint level that is a function of said transmission constraint parameter(s) and takes N distinct values referred to as constraint values;

associating said N constraint values in increasing order respectively with said N sets of optical frequencies in decreasing order of the error rate values of the associated N ranges;

assigning any signal to be transmitted a constraint value obtained by applying said measurement;

assigning said signal to be transmitted a carrier frequency belonging to one of said sets of optical frequencies that is associated with a constraint value at least equal to the constraint value assigned to said signal to be transmitted; and outputting a signal indicating the carrier frequency assigned to the signal to be transmitted.

2. The method claimed in claim 1 wherein one constraint parameter of a signal is a transmission distance that said signal must travel without benefit of individual regeneration.

3. The method claimed in claim 1 wherein one constraint parameter of a signal is a minimum transmission data rate of said signal.

4. The method claimed in claim 1 wherein one constraint parameter of a signal is a maximum error rate imposed on said signal as received after transmission.

5. The method claimed in claim 1 wherein said frequencies of said comb belong to a grid of optical frequencies spectrally spaced at a regular fashion with a given increment and are spectrally spaced in an irregular manner such that the number of frequencies belonging to at least one of said N sets of frequencies associated with a range of higher error rate values is less than the number of frequencies belonging to the set of frequencies associated with the same range of error rate values obtained if the frequencies of said comb are spaced regularly at said increment.

6. The method claimed in claim 1 wherein said measurement is obtained by addressing a table as a function of said transmission constraint parameter(s).

7. The method claimed in claim 1 wherein said measurement is obtained by means of an analytical function of said transmission constraint parameter(s).

8. An optical transmission network using wavelength distribution multiplexing to transmit signals carried by respective optical carrier frequencies belonging to a comb of optical frequencies, which network includes processor means adapted to assign optical carrier frequencies to the signals to be transmitted by a method as claimed in any of claims 1 to 7.

9. A network management device for assigning optical carrier frequencies to signals to be transmitted in an optical transmission network using wavelength division multiplexing, said frequencies belonging to a comb of optical frequencies, the signals received after transmission in said network and carried by a given carrier frequency having a mean error rate that depends on said given carrier frequency, and one or more transmission constraint parameters being associated with any signal to be transmitted, the device comprising:

means for associating N sets of optical frequencies of the comb with N respective ranges of consecutive error rate values, each of said sets comprising frequencies generating a mean error rate in the associated range;

means for defining a measured signal transmission constraint level that is a function of said transmission constraint parameter(s) and takes N distinct values referred to as constraint values;

means for associating said N constraint values in increasing order respectively with said N sets of optical frequencies in decreasing order of the error rate values of the associated N ranges;

means for assigning any signal to be transmitted a constraint value obtained by applying said measurement;

means for assigning said signal to be transmitted a carrier frequency belonging to one of said sets of optical frequencies that is associated with a constraint value at least equal to the constraint value assigned to said signal to be transmitted; and means for outputting a signal indicating the carrier frequency assigned to the signal to be transmitted.

10. The method claimed in claim 1, comprising:

receiving a request including information relating to an optical signal to be transmitted; and determining constraint parameters of the optical signal to be transmitted based on said information.

11. The device claimed in claim 9, comprising:

means for receiving a request including information relating to an optical signal to be transmitted; and means for determining constraint parameters of the optical signal to be transmitted based on said information.

12. The method claimed in claim 1, wherein N is greater than two.

13. The device claimed in claim 9, wherein N is greater than two.

* * * * *